Nov. 28, 1950 W. H. BISHOP 2,531,967
MOLDING FOR VEHICLE BODIES
Filed Nov. 6, 1948

Inventor:
William Henry Bishop
by Walter S. Heston
ATTORNEY

Patented Nov. 28, 1950

2,531,967

UNITED STATES PATENT OFFICE 2,531,967

MOLDING FOR VEHICLE BODIES

William Henry Bishop, Birmingham, England

Application November 6, 1948, Serial No. 58,757
In Great Britain November 8, 1947

4 Claims. (Cl. 293—71)

This invention relates to a new or improved moulding for vehicle bodies and more particularly to a moulding adapted to serve as a decorative and protective covering for the bumper bars of a vehicle.

According to the invention a moulding for application to the bumper bar of a vehicle comprises a rubber or like moulding of a depth substantially equal to or slightly greater than the depth of the bar and adapted to be applied to the front or outer face of the bar, rearwardly and inwardly projecting lips or flanges at the top and bottom of the moulding adapted to embrace the top and bottom edges of the bar, one or more longitudinal recesses in the front face of the moulding, and a metal insert adapted to be fitted into the recess and to be retained therein by inwardly directed lips or flanges on each edge of the recess.

The rubber moulding completely covers the front face and the top and bottom edges of the bumper bar and protects the bar from rust or other corrosion, and the metal insert or inserts give an attractive finish to the bar.

The ends of the bar and of the moulding are preferably enclosed by end caps which may be die-castings or pressings.

The bumper bar and the metal inserts in the rubber moulding may be of steel or of aluminum or light alloy and the exposed surface of the metal inserts may be polished or it may be anodised, painted or otherwise finished to match or contrast with the surface finish or decorative scheme of the vehicle body.

One practical form of bumper or guard suitable for a public service vehicle is illustrated by way of example in the accompanying drawings in which.

Figure 1:
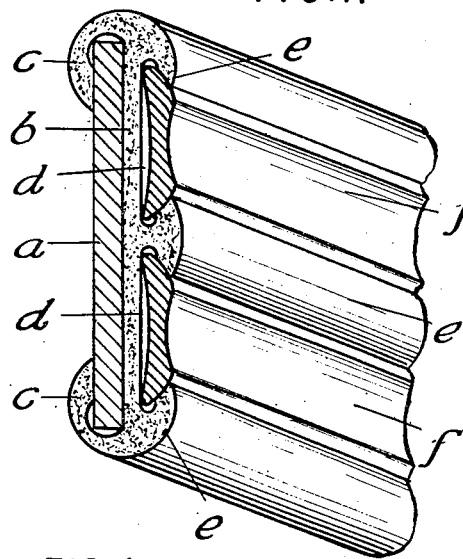
Figure 1 is a sectional perspective view of a short length of bumper bar fitted with the improved moulding.

In Figures 1 to 4 a is a flat rigid or semi-rigid bumper bar of steel or of light alloy which is of sufficient strength to withstand the stresses likely to be encountered in use. A rubber moulding b of a depth slightly greater than that of the bar is fitted against the front face of the bar and has at its top and bottom edges rearwardly and inwardly directed lips or flanges cc which embrace the top and bottom edges of the bar and the free edges of which bear against the rear face of the bar to retain the moulding securely on the bar. The top and bottom of the rubber moulding are rounded off as shown in Figure 1 to provide a smooth finish which can easily be wiped clean.

In the front face of the rubber moulding there are two vertically spaced parallel longitudinal recesses dd each having on its edges integral inwardly directed lips ee. Each recess has fitted into it a metal insert f which may be a rolled or extruded metal strip as shown or may be a sheet metal strip. The vertical depth of the insert is substantially equal to that of the recess and the edges of the insert, which are rearwardly inclined, fit under the lips ee which retain the insert securely in the recess.

Each end of the assembly formed by the bar a and the moulding b with its inserts is enclosed in a hollow end cap g which may be a die-casting or pressing and is secured in position by a bolt h passing through the cap and the bar.

Figure 4:
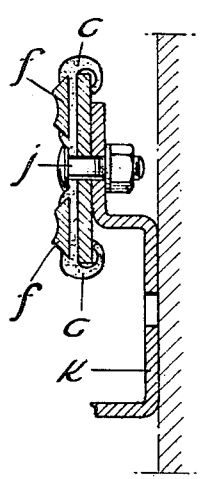
Figure 4 is a vertical section of a bumper bar fitted to a vehicle.
Figure 2:
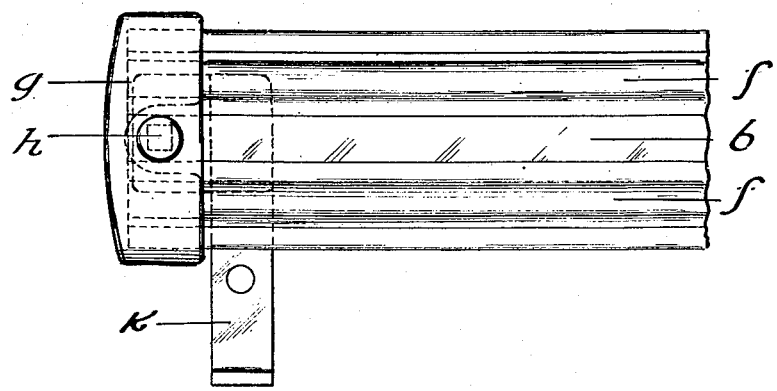
Figure 2 is a front elevation on a smaller scale of a part of the bar and an end cap.
Figure 3:
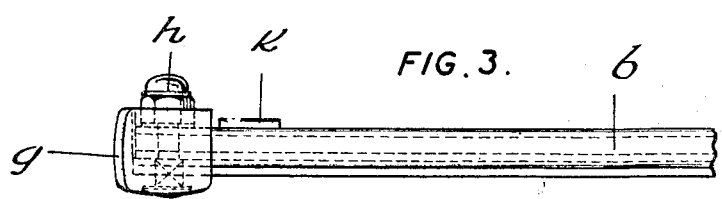
Figure 3 is a plan of Figure 2.

The bar may be mounted on the vehicle in any convenient manner. Figure 4 shows the bar secured by a bolt j to a bracket k mounted on the vehicle.

Figure 5:
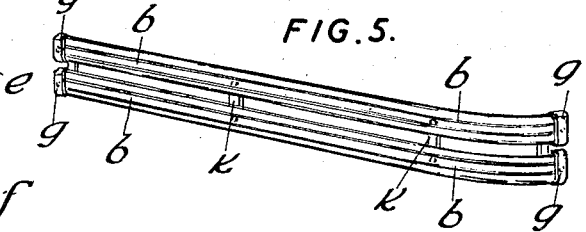
Figure 5 is a perspective view of a double bar suitable for fitting to the rear corner of an omnibus body.

Two bumper bars may be mounted in superimposed relationship on the same brackets, as shown in Figure 5, which illustrates a curved bumper suitable for the rear corner of an omnibus.

The combination of the moulding and its inserted strips provides an efficient bumper bar of attractive appearance and if the bar itself is made of light alloy the total weight can be kept low.

I claim:

1. A bumper bar for a vehicle comprising a rigid metal bar, a rubber moulding fitting against the front face of the bar and embracing the top and bottom edges of the bar, at least one longitudinal recess in the front face of the rubber moulding, integral inwardly projecting lips on the edges of said recess, and a metal insert fitting into said recess and retained therein by said lips.

2. A bumper bar for a vehicle comprising a rigid metal bar, a rubber moulding fitting against the front face of the bar and of a depth at least equal to that of the bar, rearwardly and inwardly extending lips on the top and bottom of said moulding fitting over and enclosing the top and bottom edges of said bar to retain the moulding on the bar, at least one longitudinal recess in the front face of the rubber moulding, integral inwardly projecting lips on the edges of said recess, and a metal insert fitting into said recess and retained therein by said lips.

3. A bumper bar for a vehicle comprising a rigid metal bar, a rubber moulding fitting against the front face of the bar and embracing the top and bottom edges of the bar, at least one longitudinal recess in the front face of the rubber moulding, integral inwardly projecting lips on the edges of said recess, a metal insert fitting into said recess and retained therein by said lips, and a hollow metal end cap enclosing an end of the bar and moulding and secured to the bar.

4. A decorative and protective moulding for a bumper bar on a vehicle comprising a rubber moulding adapted to fit against the front face of the bar and of a depth at least equal to that of the bar, integral rearwardly and inwardly projecting lips on the top and bottom of said moulding adapted to engage over the top and bottom edges of said bar, at least one longitudinal recess in the front face of the rubber moulding, integral inwardly projecting lips on the edges of said recess, and a metal insert fitting into said recess and retained therein by said lips.

WILLIAM HENRY BISHOP.

REFERENCES CITED

The following references are of record in the file of this patent:

UNITED STATES PATENTS

| Number | Name | Date |
|---|---|---|
| 1,682,858 | Sipe | Sept. 4, 1928 |
| 1,754,112 | Lusse | Apr. 8, 1930 |
| 2,316,035 | Westrope | Apr. 6, 1943 |